United States Patent [19]

Zajac

[11] 3,807,855
[45] Apr. 30, 1974

[54] METHOD AND APPARATUS FOR MARKING PHOTOGRAPHIC PRINT STRIPS

[75] Inventor: Peter P. Zajac, Dearborn Heights, Mich.

[73] Assignee: Guardian Industries Corporation, Northville, Mich.

[22] Filed: Dec. 26, 1972

[21] Appl. No.: 318,362

[52] U.S. Cl. .................................. 355/29, 83/209
[51] Int. Cl. ............................................ G03b 29/00
[58] Field of Search .......... 355/28, 29; 83/301, 339, 83/342, 345, 348, 365, 209

[56] References Cited
UNITED STATES PATENTS
3,507,573  4/1970  Sage et al. ............................ 355/28
3,081,679  3/1963  Hogan.................................. 355/29 X Primary Examiner—Samuel S. Matthews
Assistant Examiner—Richard A. Wintercorn

[57] ABSTRACT

In a process of printing photographic images from negatives upon a long strip of sensitized paper by exposing a portion of the paper to light shining through each negative, and advancing the strip, on a frame by frame basis, to thereby form positive prints arranged edge to edge on the strip, with the adjacent edges of each adjacent pair of prints being on a common line, i.e., without borders between adjacent prints, the step of punching a short, narrow, slit-like opening along the leading edge of each print at the time of its exposure to light, with the holes thus being along the common lines. Thereafter, following development of each such strip to form the printed pictures thereon, cutting the adjacent prints apart along their common line edges with a cutter of sufficient blade width to encompass the opening in its cut, for removal of the openings from the strip simultaneously to severing the adjacent prints, and controlling the operation of said cutter by a single means actuated by said openings.

12 Claims, 5 Drawing Figures

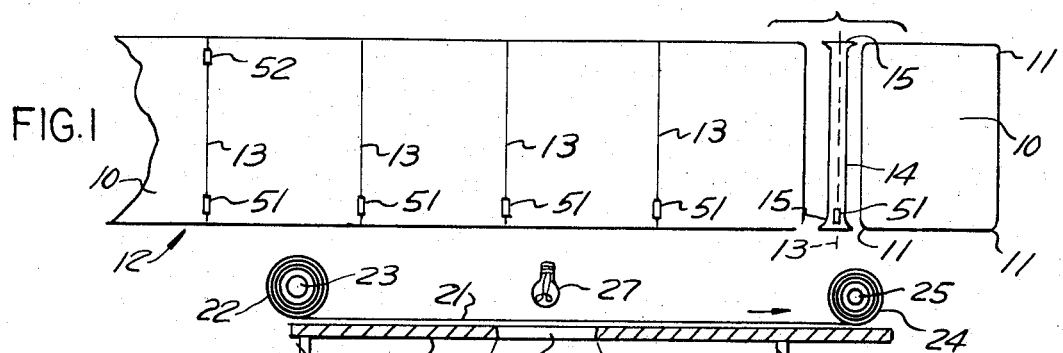
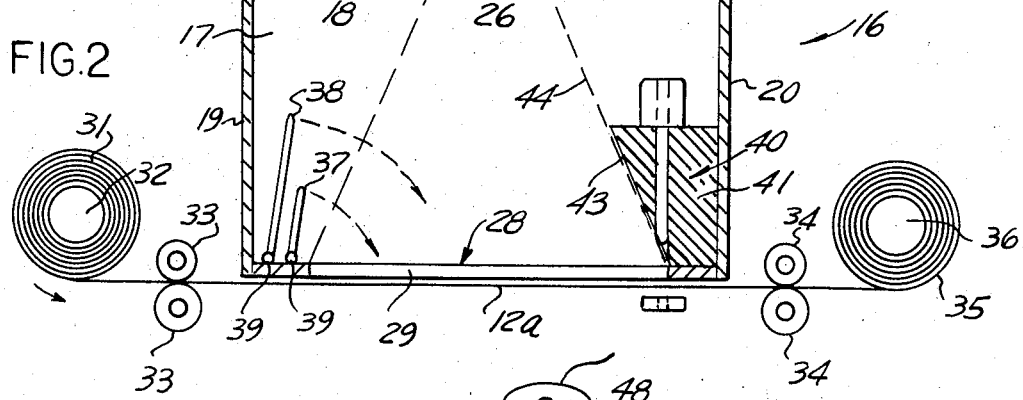
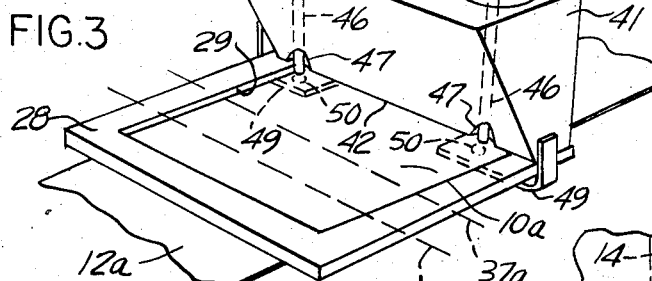
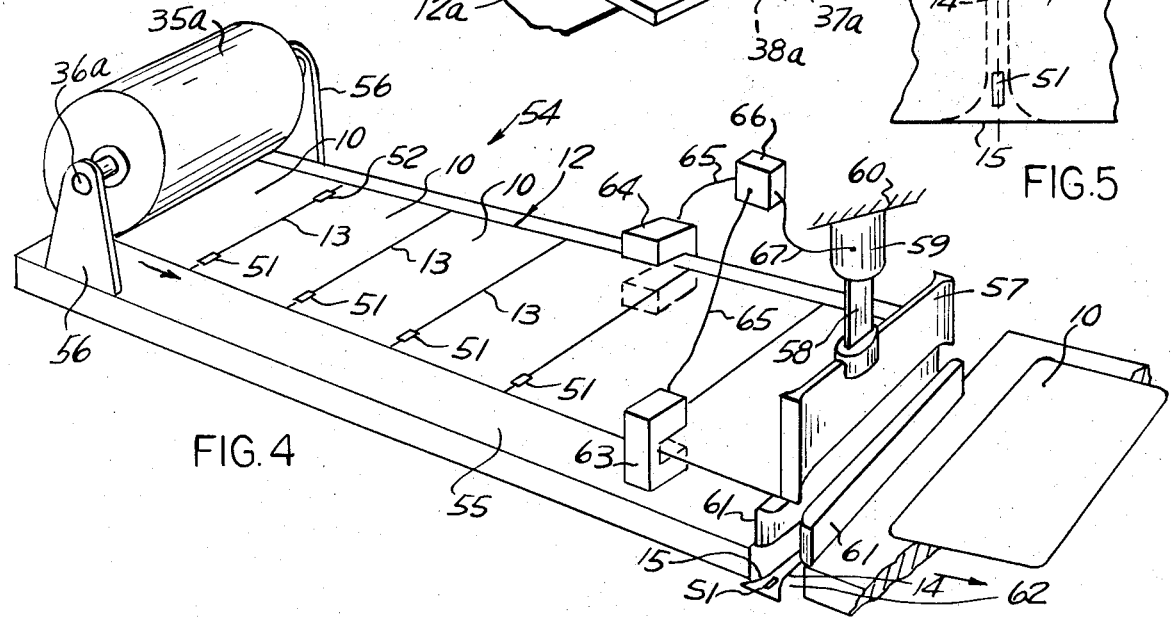

3,807,855

METHOD AND APPARATUS FOR MARKING PHOTOGRAPHIC PRINT STRIPS

BACKGROUND OF INVENTION

In the commercial processing of photographic positive prints of the so-called "snapshot" type, automatic photographic printers are used for exposing the negative images upon an elongated strip of sensitized positive print paper on a frame by frame basis. In essence, these automatic printers include an exposure chamber having an upper plate upon which a strip of negatives is advanced, frame by frame, and a lower masking frame beneath which the strip of sensitized positive paper is advanced likewise. A light source exposes the negatives to the positive strip, with both the negative and the positive strip being advanced between each exposure. Thus, these printers produce a long strip of latent prints, arranged edge to edge along the length of the paper. Each strip, after exposure to the negatives, is developed to form the positive prints, arranged edge to edge along the length of the paper, which prints are then cut apart in a suitable cutting mechanism.

In this type of system, it is important to locate the line of severance between the finished prints upon the strip, particularly by a means which can automatically control a cutter.

Conventional snapshot type of photographs consist of a square or rectangular picture area surrounded by a white border. Thus, there is a white transverse, wide area between each adjacent pair of print picture areas in conventional type prints. This area provides a space where a mark may be applied either photographically during the time of light exposure, by a suitable mechanism, or alternatively, may be applied by an ink type applicator. Thus, a mark is located approximately centrally between each pair of prints upon the front or rear of the white strip separating them, and this mark may then be used to locate the line of severance.

In the more recent type of so-called "borderless" prints, that is, pictures having no white border around the edges of the picture area, which rather extends to the four edges of the picture, there is no room for photographic markings. Ink applicator type of marks, due to their inaccuracies and smudgings, are not suitable for use in marking the line of severance between the prints.

Thus, the invention herein relates to an improved system of marking between adjacent prints by punching a hole in the appropriate location so that the hole may be used to signal or control an automatic cutter for severing the prints, which cutter when operated, removes the hole, i.e., the area surrounding or defining the hole.

SUMMARY OF INVENTION

The invention herein relates to a method and apparatus for marking the line of severance between adjacent prints formed on a long strip of photosensitive positive paper, including a punch mechanism which punches holes upon the lines separating adjacent pairs of prints during the time of exposure to the negatives, with the punch mechanism formed so as to permit close edge to edge alignment of the picture portion of the prints to form so-called "borderless prints" and wherein the holes are used to control a cutter mechanism for severing the prints from the strip and simultaneously removing a narrow slice of paper between adjacent pair of prints for removal of the holes.

The apparatus herein is so formed that it may be installed in a conventional automatic photographic printing machine without modifications of the machine or its operation and without interfering with the normal printing operation of the machine.

In addition, the punch mechanism herein may be formed to provide a marker hole at the end of each group of predetermined numbers of prints which make up a single order so that when a large group of orders are printed in succession upon a single photosensitive paper strip, the groups may be easily separated, one group from another at the time the prints are severed from the strip.

In particular, an object of this invention is to provide a simplified system and apparatus, which is inexpensive in construction and operates without interfering with the normal process of producing prints, and which provides a useful mark or signal between adjacent prints, especially of the borderless type, to enable automatic and accurate severance and grouping of the finished prints. These and other objects and advantages of this invention will become apparent upon reading the following description, of which the attached drawings form a part.

DESCRIPTION OF DRAWINGS

FIG. 1 is a plan view of a portion of a strip of photosensitive positive paper upon which borderless prints have been formed, with one print shown severed from the strip.

FIG. 2 is a schematic cross-sectional elevational view of the exposure chamber portion of a conventional automatic photographic printer.

FIG. 3 is a perspective view of the novel punch mechanism herein mounted upon the printer masking frame portion.

FIG. 4 is a perspective view of the cutter mechanism for severing the prints, one from the other.

FIG. 5 is an enlarged fragmentary view of the strip portion at two adjacent prints.

DETAILED DESCRIPTION

FIG. 1 illustrates a series of borderless type photographic positive prints 10, each having a photographic image area extending from edge to edge and, when completed, formed with convex curved corners 11.

The prints are formed, in a manner to be described below, upon a long strip of photo-sensitized positive print paper 12, with the prints arranged edge to edge with a common line 13 separating each adjacent pair of prints. The prints are severed from the strip along their common lines 13 to form a finished print as illustrated in the right hand side of FIG. 1. The actual severance is accomplished by removing a thin slice 14 having enlarged opposite ends 15 with concave corners, to form the convex print corners, which slice includes the common line 13. Thus, a purpose of the invention herein is to locate and control the cutting apart of the prints or more particularly, the slice 14 between the prints.

Strips of such type prints are conventionally made in conventional automatic photographic printing machines. Since such machines form no part of the invention herein, the relevant portion of such a machine is schematically illustrated in FIG. 2. The machine, generally designated 16, includes an exposure chamber 17, schematically shown, formed by an upper plate 18 and a rear wall or baffle 19 and a front wall or baffle 20.

A strip of developed photographic negatives 21 is arranged to move across the upper surface of the upper plate 18 in a direction indicated by the arrow. The strip is formed into a rear coil 22 wound around a rotatable spindle or spool 23 suitably mounted within the printing machine. The strip of negatives includes a large number of individual negative strips taken in different cameras by different customers and spliced end to end to form a large roll for developing purposes. Thus, the coil or roll 22 is unwound, moved across the upper plate 18 and then rewound into a forward or lead coil or roll 24 around a take-up spindle 25. Subsequent operations, not shown, separate the strips of negatives from various customers' orders and match them to the completed prints.

The strip of negatives is advanced, frame by frame, across an opening 26 in the upper plate. Above the opening is an exposure light 27 which is automatically operated by suitable controls (not shown) to shine light through the negative frame, downwwardly through the exposure chamber 17 and through a masking frame 28 having a masking opening 29 beneath which the photosensitive positive paper is located. In such type machines, suitable lenses and lens systems are used in connection with the light 27, but these are omitted as not being relevant here.

The strip 12a of the photosensitive positive paper is provided in a large roll 31 of unexposed paper wound around a spindle 32 which is suitably mounted within the machine. The strip is unrolled and guided by suitable guide or drive rollers 33 to pass beneath the frame opening 29 and then to take-up rollers or guides 34 and for rewinding into a roll 35 of exposed paper wound around a take-up spindle or spool 36.

Between light exposures from light 27, the negative strip 21 and the positive strip 12a are advanced, frame by frame. Ultimately, the exposed roll 35 is removed and developed to form the positive prints from the latent images.

To adapt the masking frame opening 29 to form different size prints, it is conventional to provide masking plates, such as short masking plate 37 and long masking plate 38, each connected by pivots or hinges 39 to the frame 28. Swinging one of these plates downwardly over the frame masks or blocks off an area such as indicated by dotted lines 37a and 38a corresponding to the respective plates and thus forms smaller size prints.

The foregoing described apparatus is conventional. The improvement herein relates to a punch unit 40 which is mounted within the above apparatus. This unit includes a bar 41 which extends transversely of the frame, that is the direction of travel of the strip 12a, with its lower rear edge 42 (see FIG. 3) forming the lead edge of the frame masked portion during light exposure. Thus, the rear wall 43 of the bar is sloped at an angle corresponding to the outermost forward light ray 44 angle (see FIG. 2). After each exposure, the strip is advanced a sufficient distance to permit the next print to be made with its lead edge common to the trailing edge of the preceding print, that is, the edge defined by bar edge 42.

Mounted within the bar are a pair of punch spindles 45 and 46, transversely aligned, and each having their lower punching end fitting through relieved openings 47 at the lower edge 42 of the bar. Each punch is operated by a suitable electrical solenoid 48. A bracket-shaped punch anvil 49 is mounted on the opposite ends of the bar and extended beneath the frame 28 and provides guide holes 50 to receive the lower end of the punch spindle.

The holes 51 formed by punch 45 and 52 formed by punch 46 are narrow, relatively elongated but short and are centered upon the common lines 13. The holes 51 form the mark between each adjacent pair of prints and the holes 52 form a mark between each group of prints, namely, the completion of one order and the beginning of another order.

The punch solenoids 48 may be connected to the same electrical circuitry which operates the light 27, etc., so that the punch 45 operates simultaneously to the operation of the light 27 and the punch 46 also operates simultaneously with the light, but only at predetermined times, namely, at the end of each specific group of prints.

As can be seen, the roll 35 of exposed positive paper includes the punched holes 51 and 52.

After the roll 35 is developed, the now developed roll 35a (see FIG. 4) mounted upon a spool or spindle 36a is placed into a cutter unit 54 for severing the prints 10 from the strip 12. The cutter unit includes a table 55 upon which are mounted brackets 56 for engagement with the spool 36a. The paper strip 12 travels along the table and is moved by suitable mechanical means, not shown, to the cutter blade 57 which is connected to an operating rod 58 operated by a solenoid 59 attached to a suitable support 60. The blade thus moves upwardly and downwardly upon operation of its solenoid. Below the blade are a pair of cutter or anvil blades 61 with a slot 62 between them to receive the slice 14 from the strip 12. It can be appreciated that other types of cutters may be used and that the foregoing is illustrative.

Mounted upon the table are a pair of photoelectric cell sensing units 63 and 64, one on each edge of the strip 12. These shine light from a light source going either upwardly or downwardly relative to the paper to a photosensitive cell on the opposite side so that when light shines through one of the slots 51 or 52, the sensing unit is activated. These are conventional devices and thus, no further description need be given here.

Actuation of either of the sensing units causes a signal to be transmitted through their wire connections 65 to a relay controlled power supply 66 which is schematically illustrated and which in turn transmit power through its wire 67 to the blade operating solenoid 59. In effect, when the sensing unit 63 senses a hole 51, the blade is caused to cut along the line 13 which precedes the sensed hole.

The sensing unit 64, sensing holes 52, signals the completion of an order. That signal may be used to shut off the cutter blade until the severed prints are removed manually of alternatively may operate other mechanisms which separate one order from another.

The slicing away of the narrow slice 14 between adjacent prints removes the holes 51 or 52 from the finished product, that is, it removes the material surrounding the holes. The slice also removes any overlap between adjacent prints which might have taken place because of slight misalignment between adjacent prints in the exposure chamber. Also, the widening of the opposite ends of the slice, not only forms the rounded corners of the individual prints, but also compensates for Having fully described an operative embodiment of this invention, I now claim:

1. In a method for making photographic prints using a long, narrow strip of photo-sensitive print forming paper, including successively exposing portions of the paper to light shown through negatives within an enclosure, and advancing the strip between each light exposure to form adjacent prints along the length of the strip and extending across the strip, with adjacent pair of prints abutting edge to edge along a line transverse of the strip, and then developing the prints and finally separating the prints by cutting the strip apart in a cutter device having a cutter blade which cuts along each of said lines to form separate, individual prints, the improvement comprising:

simultaneously with the exposure of said photosensitive paper and within said enclosure, punching a narrow hole through the strip along each of said lines at the time the strip portion defined by each adjacent pair of said lines is arranged beneath the light form exposure thereto;

sensing said holes when the strip is moved through the cutter device for controlling the operation of the cutter blade to cut along each of said lines;

and removing the hole, i.e., the strip material defining the hole, by cutting away a narrow transverse slice of the strip which contains the line and hole, with the cutter blade, as the blade cuts the prints apart.

2. A method as defined in claim 1, and each said hole being in the form of a short, narrow, slit formed in the strip and extending in the direction of and along its respective line.

3. A method as defined in claim 1, and wherein the photographic image areas of said prints extend up to said lines, that is, without a non-photographic image border separating the adjacent pairs of prints.

4. In a process of printing borderless photographic prints from negatives, upon a long strip of sensitized photographic positive paper by exposing a portion of the paper to light shining through each negative, and advancing the paper strip, on a frame by frame basis, to thus form positive prints arranged edge to edge on the strip, with the adjacent edges of each adjacent pair of prints being on a common line, that is, without borders between adjacent edges, the improvement comprising:

punching a short, narrow slit-like opening along the leading edge of each print at the time of its exposure to light, with the hole thus being along the common edges of each adjacent pair of prints;

thereafter, following development of each strip to form the printed pictures thereon, cutting the adjacent prints apart along their common line edges with a cutter of sufficient blade width to remove a narrow, transverse slice from said strip, which slice is approximately the width of and includes the respective opening, for removal of the openings from the strip at the time of separating the adjacent prints;

said cutter forming a widening portion adjacent the opposed edges of the strip, with the widened portions being concavely curved at the corners of the slice for correspondingly forming convex curves at the corners of each print, and with the punch forming the openings in the areas to be included in each of said widened portions to thereby compensate for slight misalignments of the holes in the strip lineal direction;

and controlling the operation of said cutter by a signal means which is actuated upon sensing said openings.

5. In a process as defined in claim 4 above, and including punching a second opening, transversely aligned with a first opening formed at the opposite edge of the strip, simultaneously to punching the first opening but only at the end of each predetermined numbered group of prints;

and sensing the second opening for signalling the end of each such group of prints as the strip passes through the cutter.

6. In a photographic printer for forming photographic prints, one by one, upon an elongated strip of photographic sensitized paper, including a frame beneath which the strip is advanced for successively exposing portions of the paper to a light mounted above the frame and arranged to shine, upon actuation thereof, through photographic negatives, one at a time, arranged a distance above the paper strip for producing prints, arranged edge to edge, along the length of the strip, the improvement comprising:

a punch mounted at the lead edge of the frame and means for actuating the punch for punching a hole in the portion of the strip exposed by the frame to the light, but at the line defined by a transverse edge of said frame;

a long block mounted upon said frame and extending transversely of the strip, with the block having a rear face, relative to the direction of travel of the strip, and with the lead edge line of the frame, i.e., relative to the direction of travel of the strip, being defined by the lower edge of the rear face of the block, that is the edge of the block located at the frame, and said punch being mounted upon and extending through said block with its lower punching end intersecting said lead edge line for punching along said line;

wherein, as the strip is advanced beneath the frame, a hole is formed along the line separating each print portion from its preceding print portion, whereby said hole may be used, after development of the strip for controlling the operation of a cutter for cutting the strip along the transverse lines located by said holes for cutting apart the successive prints formed on the strip.

7. A construction as defined in claim 6, and with the rear face of the block being sloped from the frame towards the light at an angle of slope corresponding to the ray of light extending from the frame lead edge to the light.

8. A construction as defined in claim 7, and said punch being formed for actuation simultaneously to actuation of the light.

9. A construction as defined in claim 7, and wherein said prints are arranged edge to edge, without borders, between the photographic images thereon, so that said lead edge defines the line separating the image portions of said prints, with the holes thus being arranged along said lines and said punch forming a longitudinally narrow, relative to the longitudinal direction of the strip, and transversely relatively short hole, approximately centered on the respective lines.

10. In a process of printing borderless photographic prints from negatives, upon a long strip of sensitized photographic positive paper by exposing a portion of the paper to light shining through each negative within an enclosure, and advancing the paper strip, on a frame by frame basis, to thus form positive prints arranged edge to edge on the strip, with the adjacent edges of each adjacent pair of prints being on a common line, that is, without borders between adjacent edges, the improvement comprising:

simultaneously with the exposure of said sensitized paper and within said enclosure, punching a short, narrow slit-like opening along the leading edge of each print at the time of its exposure to light, with the hole thus being along the common edges of each adjacent pair of prints;

thereafter, following development of each strip to form the printed pictures thereon, cutting the adjacent prints apart along their common line edges with a cutter of sufficient blade width to remove a narrow, transverse slice from said strip, which slice is approximately the width of and includes the respective opening, for removal of the openings from the strip at the time of separating the adjacent prints;

and controlling the operation of said cutter by a signal means which is actuated upon sensing said openings.

11. In a photographic printer for forming photographic prints, one by one, upon an elongated strip of photographic sensitized paper, including a frame beneath which the strip is advanced for successively exposing portions of the paper to a light mounted above the frame and arranged to shine, upon actuation thereof, through photographic negatives, one at a time, arranged a distance above the paper strip for producing prints, arranged edge to edge, along the length of the strip, the improvement comprising:

a punch mounted at the lead edge of the frame and means for actuating the punch for punching a hole in the portion of the strip exposed by the frame to the light, but at the line defined by a transverse edge of said frame;

wherein, as the strip is advanced beneath the frame, a hole is formed along the line separating each print portion from its preceding print portion, whereby said hole may be used, after development of the strip for controlling the operation of a cutter for cutting the strip along the transverse lines located by said holes for cutting apart the successive prints formed on the strip; and a second punch located at the lead edge of the frame, with the respective punches each being located near the opposite sides of the frame, and means for operating the second punch to punch a hole transversely aligned with the hole formed by the first mentioned punch, but only at the end of a predetermined number of prints, for thereby providing a means for signalling the end of an order comprising a predetermined number of prints at the time of the operation of the cutter.

12. In a photographic printer for forming photographic prints, one by one, upon an elongated strip of photographic sensitized paper, including an enclosure frame beneath which the strip is advanced for successively exposing portions of the paper to a light mounted above the frame and arranged to shine, upon actuation thereof, through photographic negatives, one at a time, arranged a distance above the paper strip for producing prints, arranged edge to edge, along the length of the strip, the improvement comprising:

a punch mounted at the lead edge of the frame and within said enclosure and means for actuating the punch for punching a hole in the portion of the strip exposed by the frame to the light, but at the line defined by a transverse edge of said frame;

said means automatically actuated during the exposure sequence, when said light is on;

wherein, as the strip is advanced beneath the frame, a hole is formed along the line separating each print portion from its preceding print portion, whereby said hole may be used, after development of the strip for controlling the operation of a cutter for cutting the strip along the transverse lines located by said holes for cutting apart the successive prints formed on the strip.

* * * * *